(12) United States Patent
Sishtla

(10) Patent No.: US 6,857,445 B2
(45) Date of Patent: Feb. 22, 2005

(54) FLOAT VALVE FOR PULSATING FLOW

(75) Inventor: Vishnu M. Sishtla, Manlius, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/610,983

(22) Filed: Jun. 30, 2003

(65) Prior Publication Data

US 2004/0261845 A1 Dec. 30, 2004

(51) Int. Cl.⁷ .............................................. F16K 31/18
(52) U.S. Cl. ...................................... 137/192; 137/196
(58) Field of Search ................................ 137/185, 192, 137/196

(56) References Cited

U.S. PATENT DOCUMENTS

| 130,490 A | * | 8/1872 | Dick | 137/192 |
| 840,583 A | * | 1/1907 | Pickels | 137/192 |
| 6,443,177 B2 | * | 9/2002 | Romanek | 137/202 |

* cited by examiner

Primary Examiner—Gerald A. Michalsky
(74) Attorney, Agent, or Firm—Bachman & LaPointe, PC

(57) ABSTRACT

A float bell for use in a condenser comprising a center sleeve extending along a centerline comprising a first and second perimeter, an outer sleeve comprising a first and second perimeter encompassing the center sleeve, a top in contact with the second perimeter of the outer sleeve and the second perimeter of the center sleeve, and a plurality of stiffeners extending between the center sleeve and the outer sleeve.

7 Claims, 3 Drawing Sheets

FLOAT VALVE FOR PULSATING FLOW

BACKGROUND OF THE INVENTION

(1) Field of the Invention

The present invention relates to a float valve for use in a compressor adapted to provide increased performance when subjected to pressure pulsations. More particularly, the present invention relates to a float bell comprising stiffeners fashioned to diminish acceleration of the float bell in response to pressure pulsations.

(2) Description of Related Art

Float valves are used in water cooled chillers for maintaining a liquid seal and for controlling flow to the evaporator. In screw chillers, capacity and performance are improved through the use of an economizer cycle. During such an economizer cycle, the economizer flow is introduced into the screw compressor chamber between inlet and outlet ports. Because the screw compressor is a positive displacement compressor, it produces high pressure pulsations. As a result, the float valve in the economizer chamber is subjected to these pulsations which can lead to failure. In particular, the float bell which forms a central part of the float valve is subject to fatigue and failure at the joint formed between the outer dome and the inner tube.

What is therefore needed is a float bell design which minimizes the incidence of fatigue and failure.

SUMMARY OF THE INVENTION

It is an object of the present invention to provide a float bell for use in a condenser which comprises a center sleeve extending along a centerline comprising a first and second perimeter, an outer sleeve comprising a first and second perimeter encompassing the center sleeve, a top in contact with the second perimeter of the outer sleeve and the second perimeter of the center sleeve, and a plurality of stiffeners extending between the center sleeve and the outer sleeve.

It is a further object of the present invention to provide a float valve assembly which comprises a float bell comprising a center sleeve extending along a centerline comprising a first and second perimeter, an outer sleeve comprising a first and second perimeter encompassing the center sleeve, a top in contact with the second perimeter of the outer sleeve and the second perimeter of the center sleeve, a plurality of stiffeners extending between the center sleeve and the outer sleeve, an outer standpipe, and an inner moving sleeve in contact with the outer standpipe capable of movement against said outer standpipe, the inner moving sleeve connected to the float bell by an attachment means.

DETAILED DESCRIPTION OF THE PREFERRED EMBODIMENT(S)

It is a central teaching of the present invention to disclose a float bell which possesses increased rigidity compared to float bells utilized at present and, consequently, exhibits a higher natural frequency. As a result of the increased stiffness and higher natural frequency, the float bell of the present invention experiences less acceleration in response to excitation frequencies in a range equivalent to the high pressure frequency pulsations of the compressor environment in which the float bell of the present invention operates. Such resistance to acceleration arising in response to high pressure pulsations results in a lesser amount of fatigue to the components comprising the float bell, and therefore contributes to increased life time of operation of the float bell.

Figure 1:
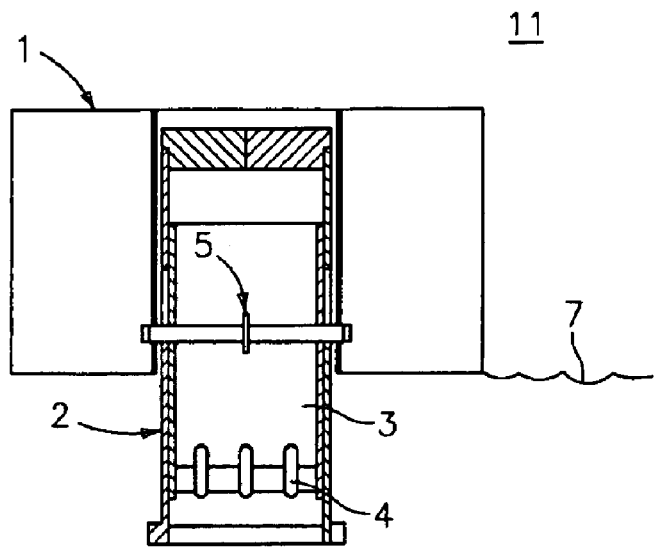
FIG. 1 is an illustration of a float valve known in the art.

With reference to FIG. 1, there is illustrated a float valve assembly 11 known in the art. Float valve assembly 11 consists of a float bell 1, an outer stand pipe 2 and an inner moving sleeve 3. Float bell 1 is connected to the inner moving sleeve 3 by an attachment means, preferably pin 5. Float valve assembly 11 is placed in an economizer vessel which receives two phase liquid and vapor from a condenser. The liquid level 7 in the economizer determines the position of the float bell 1 which floats upon a liquid forming liquid level 7. As the float bell 1 is attached to the inner moving sleeve 3, floatation of the float bell 1 determines the vertical position of the inner moving sleeve 3 as relative to valve openings 4 and thus the extent to which valve openings 4 are open to allow flow.

Figure 2:
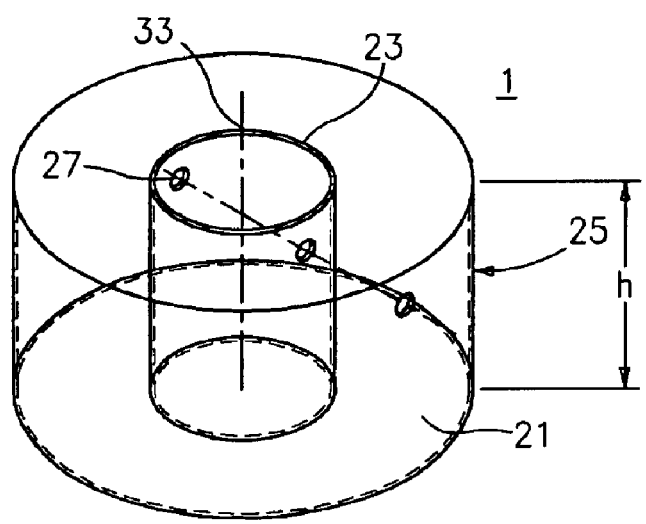
FIG. 2 is a perspective rendering of a float bell known in the art.

With reference to FIG. 2, there is illustrated in increased detail the construction of float bell 1 as known in the art. Float bell 1 is comprised of a center sleeve 23 and an outer sleeve 25. Outer sleeve 25 generally encompasses inner sleeve 23. In a preferred embodiment, both center sleeve 23 and outer sleeve 25 are cylindrical in form and of an approximately identical height h. Center sleeve 23 and outer sleeve 25 are generally symmetrically disposed about centerline 33. Both center sleeve 23 and outer sleeve 25 possess a first perimeter and second perimeter located at the top and bottom of each sleeve 23, 25. In a preferred embodiment, as both center sleeve 23 and outer sleeve 25 are cylindrical in form, the first and second perimeter of each sleeve 23, 25 forms a circle. Center sleeve 23 is attached to outer sleeve 25 via top 21. Top 21 is of a shape sufficient to permit both outer sleeve 25 and inner sleeve 23, enclosed within outer sleeve 25, to rest in contact with top 21 along the entire extent of a perimeter of center sleeve 23 and a perimeter of outer sleeve 25.

In addition, float bell 1 traditionally incorporates openings 27 through which pin 5 may be inserted so as to attach float bell 1 to inner moving sleeve 3. Such float bells are often fabricated of aluminum. Center sleeve 23 and outer sleeve 25 are often brazed to top 21. When constructed in such manner and operated as a part of float valve assembly 11 as illustrated in FIG. 1, float bell 1 moves up and down in correspondence with liquid level 7 and in turn moves inner moving sleeve 3 up and down in correspondence with changes in the liquid level 7. In arrangements where there exists no pulsating flow of liquid or vapor, such a design is not likely to experience failure. However, when the chamber in which float valve assembly 11 is operated is connected to a compressor capable of generating pressure pulsations, the brazed joints between top 21 and center sleeve 23 and outer sleeve 25 are subject to fatigue and failure may result.

Figure 3A:
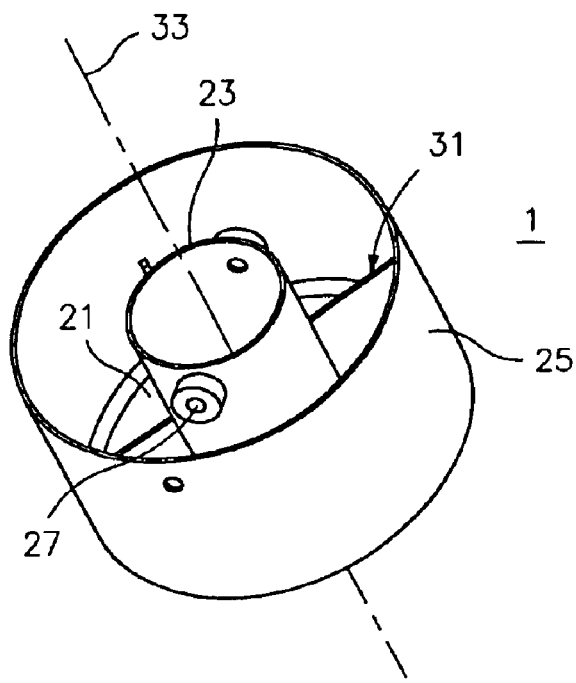
FIG. 3A is a perspective rendering of the float bell of the present invention.
Figure 3B:
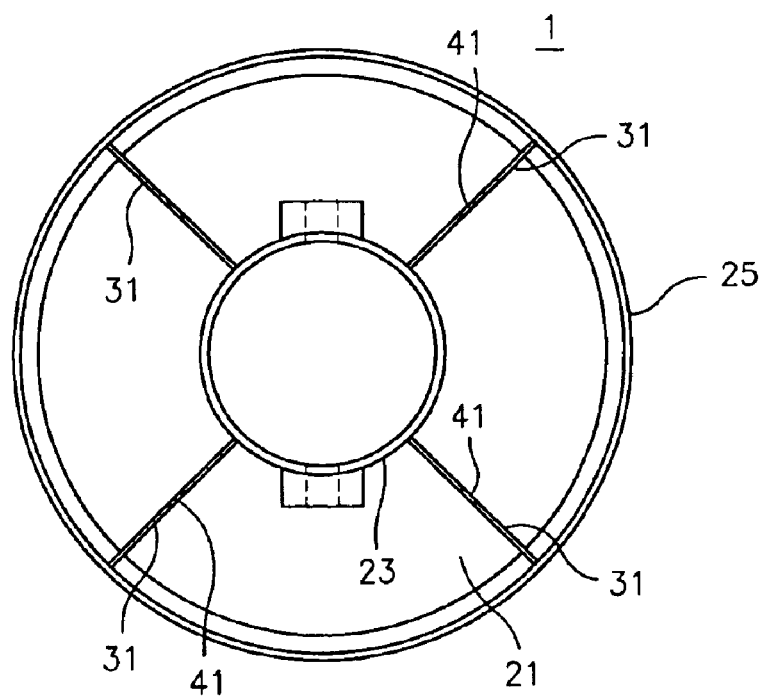
FIG. 3B is a bottom view of the float bell of the present invention.

It is with this prospect of fatigue and failure in mind that the float bell 1 of the present invention is illustrated with reference to FIGS. 3A-B. With reference to FIG. 3A, there is illustrated an isometric view of the design of the float bell 1 of the present invention. Float bell 1 of the present invention is similar to float bells of the prior art with the notable exception of the addition of one or more stiffeners 31. In a preferred embodiment, float bell 1 of the present invention incorporates four stiffeners extending radially away from a centerline 33 between center sleeve 23 and outer sleeve 25. Preferably, stiffener 31 is fabricated from aluminum but may be fabricated from any metal or other material sufficient to provide increased stiffness to float bell 1 so as to result in a desired acceleration of float bell 1 in response to pressure pulsations. With reference to FIG. 3B, there is illustrated a bottom view of the float bell 1 of the present invention illustrating the inclusion of four stiffeners 31. While any number of stiffeners may be used in the float bell 1 of the present invention, it is preferable to angularly displace stiffeners 31 equally about centerline 33. For example, in the present illustration each of the four stiffeners 31 is separated by approximately 90° from adjacent stiffeners 31. Likewise, were three stiffeners 31 to be employed, each stiffener would be separated by 120° from adjacent stiffeners 31. In a preferred embodiment, each stiffener 31 is constructed with a stiffener opening 41 passing completely through each stiffener 31. The stiffener openings 41 are of a size sufficient to allow equalization of liquid levels in chambers formed by the volume extending between adjacent stiffeners 31. In a preferred embodiment, stiffener openings 41 are circular in shape. Preferably, stiffeners 41 extend so as to engage in contact with top 21 forming a continuous seal from center sleeve 23 to outer sleeve 25 extending upon an edge of each stiffener 31. Preferably, stiffeners 41 are brazed to outer sleeves 25, inner sleeve 23, and top 21. However, in an alternative embodiment, stiffener 31 may not form a continuous seal along an edge of a stiffener 31 extending from center sleeve 23 to outer sleeve 25. In such an instance, a gap or area of discontinuity between an edge of stiffener 31 and top 21 provides a stiffener opening 41 through which liquid levels can be equalized.

Openings 41 advantageously serve to allow fluids, either liquid or gas, to equalize between chambers defined within float bell 1 as divided by stiffeners 31, thereby avoiding uneven buoyancy forces exerted upon float bell 1 by liquid 7.

It is important to maintain equal liquid levels in each of the chambers created between adjacent stiffeners 31. The presence of different liquid levels in such chambers can cause a difference in buoyancy force and tend to tilt the float bell 1. A tilted float bell 1 will not slide freely and is prone to jamming. The inclusion of stiffeners 31 in float bell 1 cause float bell 1 to have a higher natural frequency and therefore to experience less acceleration in response to the above-noted pressure pulsations. In a preferred embodiment, stiffeners 31 are constructed predominantly of aluminum or an aluminum based alloy. While illustrated as constructed of aluminum, the present invention is not so limited, rather the stiffeners 31 of the present invention may be constructed of any metal sufficient to provide a desired natural frequency of float bell 1.

Figure 4:
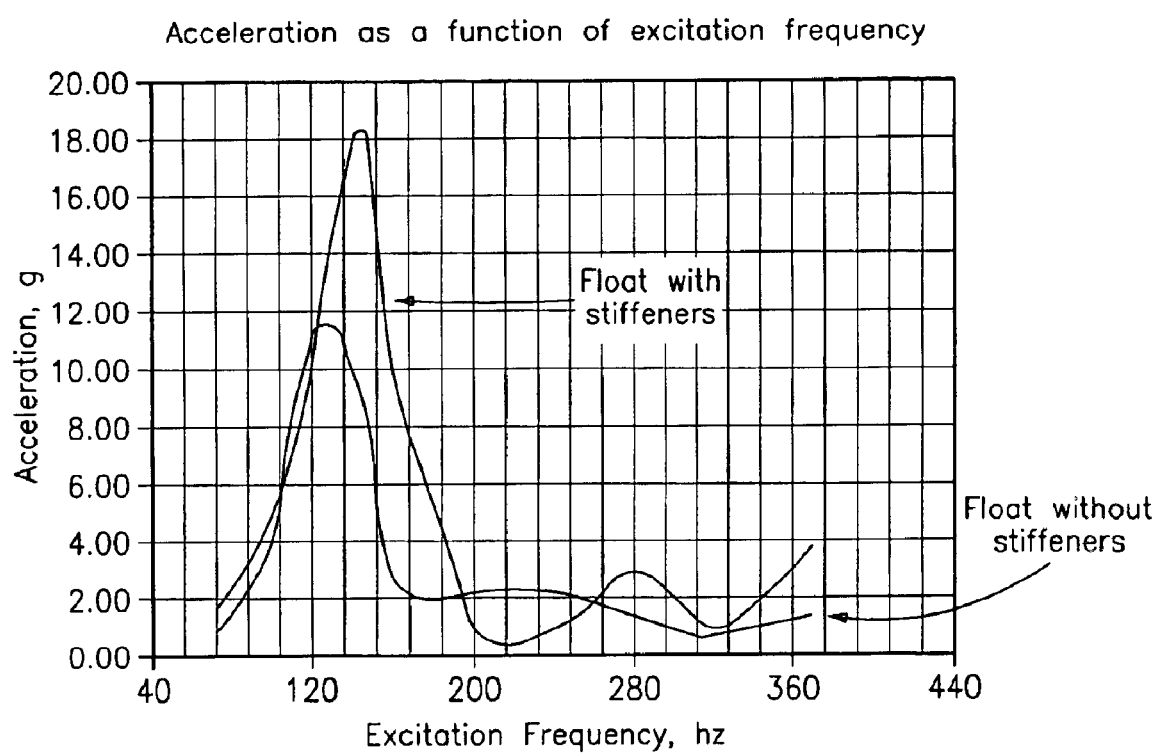
FIG. 4 is a graph of the acceleration response to an excitation frequency of both the float bell of the prior art and the float bell of the present invention.

With reference to FIG. 4, there is illustrated test data illustrating the acceleration, and hence the force on top of a float bell 1 of the present invention as well as that of a float bell of the prior art when operated in a screw compressor. As is clearly evident, a float bell 1 of the present invention produces an acceleration in response to an excitation frequency which is markedly decreased in amplitude. In addition, the float bell 1 of the present invention results in a response wherein a shift in the peak amplitude frequency occurs. Lastly, the float bell 1 known in the art exhibits two peaks in acceleration in response to an excitation frequency. It is of note that the float bell 1 of the present invention does not exhibit a second peak.

It is apparent that there has been provided in accordance with the present invention a float bell comprising stiffeners fashioned to diminish acceleration of the float bell in response to pressure pulsations which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A float bell for use in a condenser comprising:
    a center sleeve extending along a centerline comprising a first and second perimeter;
    an outer sleeve comprising a first and second perimeter encompassing said center sleeve;
    a top in contact with said second perimeter of said outer sleeve and said second perimeter of said center sleeve; and
    a plurality of stiffeners extending between said center sleeve and said outer sleeve;
    wherein each of said plurality of stiffeners comprises a stiffener opening.

2. The float bell of claim 1 wherein said plurality of stiffeners extend radially away from said centerline.

3. The float bell of claim 1 wherein said plurality of stiffeners are angularly spaced by equal amounts about said centerline.

4. The float bell of claim 1 wherein said stiffener openings are of a size and placement sufficient to permit an equalization of a liquid level present in each of a plurality of chambers formed between each of said plurality of stiffeners.

5. The float bell of claim 1 wherein said plurality of stiffeners are comprised of a material selected from the group consisting of aluminum and aluminum alloys.

6. A float valve assembly comprising:
    a float bell comprising:
        a center sleeve extending along a centerline comprising a first and second perimeter;
        an outer sleeve comprising a first and second perimeter encompassing said center sleeve;
        a top in contact with said second perimeter of said outer sleeve and said second perimeter of said center sleeve;
        a plurality of stiffeners extending between said center sleeve and said outer sleeve;
    an outer standpipe; and
    an inner moving sleeve in contact with said outer standpipe capable of movement against said outer standpipe, said inner moving sleeve connected to said float bell by an attachment means.

7. The float valve assembly of claim 6 wherein said attachment means is a pin.

* * * * *